(12) United States Patent
Taniguchi

(10) Patent No.: US 7,587,486 B2
(45) Date of Patent: Sep. 8, 2009

(54) CLICK STREAM ANALYSIS

(75) Inventor: David Taniguchi, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 928 days.

(21) Appl. No.: 10/338,448

(22) Filed: Jan. 8, 2003

(65) Prior Publication Data

US 2004/0133671 A1    Jul. 8, 2004

(51) Int. Cl.
    G06F 15/16    (2006.01)
    G06F 15/173   (2006.01)
(52) U.S. Cl. ................... 709/224; 709/236; 705/10
(58) Field of Classification Search ........... 709/224
    See application file for complete search history.

(56) References Cited

U.S. PATENT DOCUMENTS

| | | | | |
|---|---|---|---|---|
| 6,691,106 B1* | 2/2004 | Sathyanarayan | ............... | 707/3 |
| 6,877,007 B1* | 4/2005 | Hentzel et al. | ............... | 707/10 |
| 7,025,209 B2* | 4/2006 | Hawkins | ............... | 209/217 |
| 2002/0061029 A1* | 5/2002 | Dillon | ............... | 370/432 |
| 2002/0065912 A1* | 5/2002 | Catchpole et al. | ............... | 709/224 |
| 2002/0171677 A1* | 11/2002 | Stanford-Clark | ............... | 345/738 |

* cited by examiner

*Primary Examiner*—William C Vaughn, Jr.
*Assistant Examiner*—Joiya M Cloud
(74) *Attorney, Agent, or Firm*—Lee & Hayes, PLLC

(57) ABSTRACT

A path calculation report is derived from a Web log having therein a plurality of Universal Resource Identifiers (URI) each corresponding to a request made by a user to a server of a Web site containing one or more web pages. The report displays, in sequential order, all of the URI that correspond to each click path through the Web Site by one or more users during one or more visits to the Web site. Each URI corresponding to each click path is derived by decompressing a fixed length number representing a compressed URI that corresponds to each request of the corresponding click path through the Web Site.

26 Claims, 5 Drawing Sheets

CLICK STREAM ANALYSIS

TECHNICAL FIELD

This invention relates to Web servers, and more particularly, to click stream analysis of client interactions with Web servers.

BACKGROUND

The increasing diversity of click stream analysis involves the analysis of user requests when visiting a Web site. Each request by a user represents a request to a server of the Web site that was made by the user 'clicking' on a visual object on a Web page on the Web site with a mouse or other input device. The visual object can be an icon, a hyperlink, or another logical representation of the request. These requests are stored in a Web server log for the Web site, where each log record typically corresponds to a single request for a single event. Click stream analysis is intended to aid Web site owners in understanding how visitors are using their Web site.

Current click stream analysis products typically provide aggregate path analysis reports, which show general trends of how users are using particular Web sites. The size of data that is accumulated for at a particular Web site can be enormous because the accumulated data includes each request by each user during each visit. If the Web site is actively used by the public, and multiple servers are used to provide web services to the Web site, the accumulated data can exceed one (1) terabyte in a period of 24 hours. For this reason, current click stream analysis products typically provide aggregate path analysis reports (e.g. path calculation reports) that are limited to a depth of six (6) user clicks or less from where a user enters the Web site. This limitation on click depth in aggregate path analysis reports has an inherent lack in granularity. In many instances, this lack in granularity for high user volume Web site causes a failure of the aggregate path analysis reports to adequately assist the Web site owner or analyst in reconstructing precisely what behavior (e.g. all of the series of 'clicks' or server-requests) led users to particular requests (e.g. purchasing an item) when visiting the Web site. For instance, the owner of a high user volume Web site, or an analyst thereof, desires to reconstruct each user request and represent the same in a path calculation report. To do so, the path calculation report will have to show more than six sequential clicks by the users. For this kind of exhaustive click stream analysis, the entire Web server log needs to be scanned, collated and queried, which requires excessive accumulation of data in an inefficient and time consuming process that is rarely justified by its expense.

SUMMARY

A path calculation report is produced from data in a data structure that is derived from a Web log. The Web log contains each request, represented as a Universal Resource Identifier (URI), by each user of a Web site. The path calculation report can include a count of the users having the same click path through the Web site as well as the sequential order all of the URIs for each user request for each click path. Each URI for the path calculation report are derived from a decompression of a compressed fixed length number that represents the URI and that is stored in the data structure. The data structure also includes request entries in a request table representing each request by a user, visit entries in a visit table representing each visit by each user to the Web site, and summary entries in a summary table representing each unique click path followed by a user through the Web site.

BRIEF DESCRIPTION OF THE DRAWINGS

The detailed description is described with reference to the accompanying figures in which the same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

Overview

Figure 1:
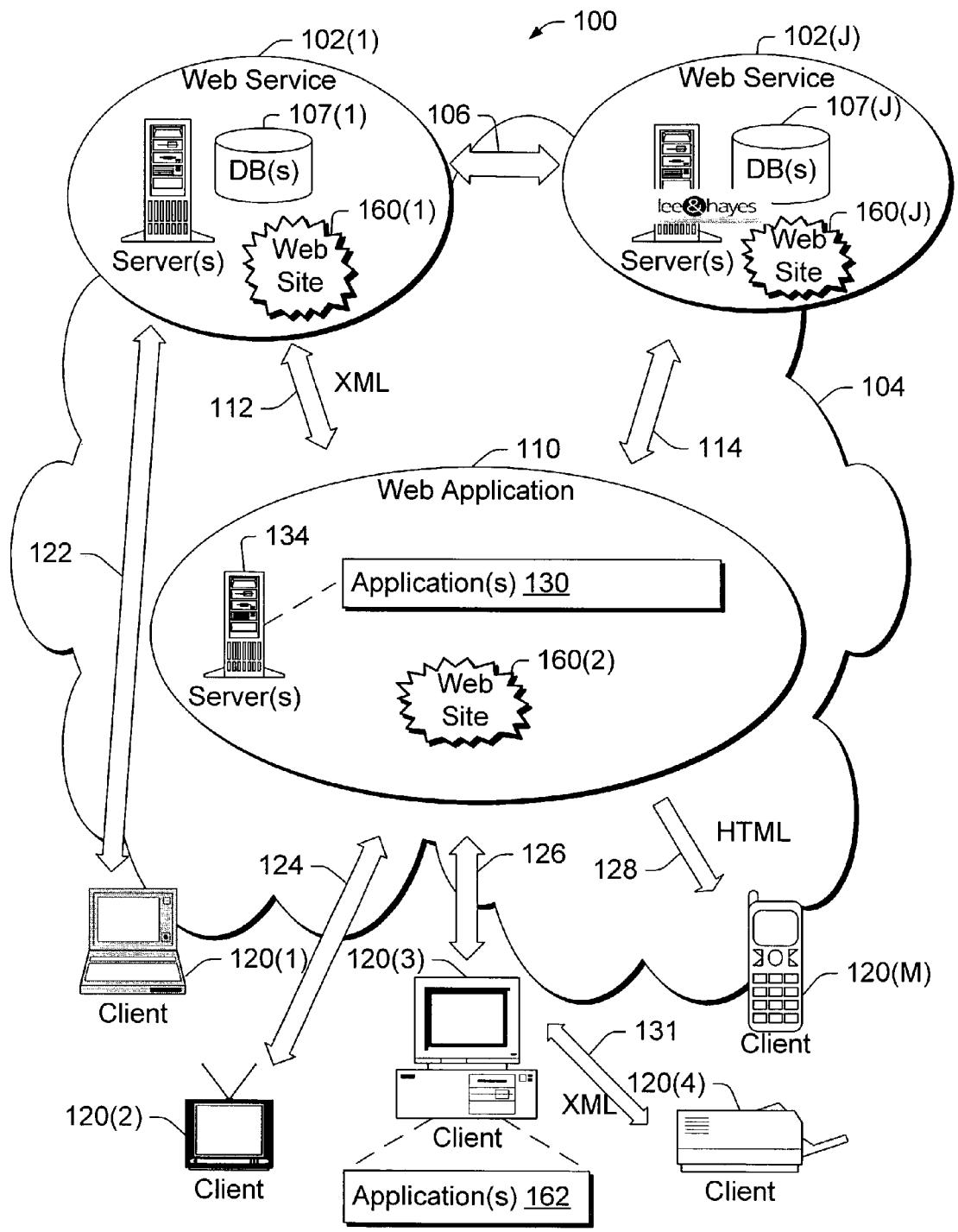
FIG. 1 shows a network environment in which a click stream analysis application may be implemented.

To overcome problems including those described in the Background section, the following description introduces the broad concept of using a Web log to reconstruct each request made by a user to a server for a Web site during the user's visit to the Web site. The request is represented by a Universal Resource Identifier (URI). A visit is determined for a collection of requests made by the same user. The reconstruction logically represents all of the requests made by one user in one visit by compressing the corresponding one or more URI thereof to produce a fixed length number. The fixed length number is substantially unique for the sequence of clicks made by the user during the visit. This compression to a substantially unique fixed length number advantageously reduces data storage requirements. Due to the low data storage requirements made possible by compression techniques, the reconstruction scales to high user volume web sites. This reconstruction can then be used to prepare a path calculation report to show a relatively large number of clicks by each user, in the respective sequential order thereof, during a visit to a web site. The reconstruction, and/or the path calculation report, can be used to perform extensive behavior analysis across the click activities of many users in an aggregate form during their respective visits to the Web site.

An analyst may wish to examine the behavior of certain users that requested a "commerce event". In particular, the analyst can use the reconstruction, and/or the path calculation report, to examine the sequence of all user clicks, across all users, that occurred prior to and/or subsequent to the commerce event. By way of example, and not by way of limitation, a commerce event can be any request made by a user at a Web site that is deemed a point of great interest, because the event typically represents a culmination of a user's navigational journey(s) through the Web site or the event results in some type of request that determines the outcome of the navigation. For instance, while visiting a Web site a user may purchase a product, click on an advertisement, add an item to a virtual shopping basket: all of which are the type of requests that might warrant a logging of a commerce event, because they represent special or the more interesting requests of a user's click activity.

Personnel managing the Web site can use the reconstruction, and/or the path calculation report, in a variety of ways, such as where additional or alternative requests can be considered to be a commerce event on their respective Web site. Thus, a commerce event may also be a designated event (i.e., a request) that marks a point in a user's click activity in which there is a desire to track and determine what the user's click activity was prior to and subsequent to such a designated request. By way of example, a software provider may want to designate a request to download free software as such a point, and then perform a click stream analysis with respect to an unlimited number of clicks prior to or after that point. To do so, one or more techniques including a hashing algorithm as described herein can be used to prepare an exhaustive path calculation report. This path calculation report is then used to perform a click stream analysis. Once the click stream analysis has been performed upon the exhaustive path calculation report with respect to the point of particular interest, the analyst may then have gained the best practical understanding of user behavior at the various Web pages of the Web site. Once such understanding might be with respect to a particular advertisement that had been shown to Web site users in a daughter window or in a banner. The click stream analysis can provide an understanding of the 'reach and frequency' of user exposure to the advertisement. The analyst can then use this understanding to suggest additions, deletions, and/or modifications to the Web pages of the Web site and thereby influence future behavior of prospective Web site users.

Exemplary Network Environment

FIG. 1 shows a network environment 100 in which a click stream analysis application 130 may be implemented. The network environment 100 includes representative Web services 102(1), . . . , 102(J), which provide services that can be accessed over a network 104 (e.g., Internet). The Web services, referenced generally as number 102, are programmable application components that are reusable and interact programmatically over the network 104, typically through industry standard Web protocols, such as Extensible markup language (XML), hypertext transport protocol (HTTP), and simple mail transfer protocol (SMTP), although other means of interacting with the Web services over the network may also be used, such as simple object access protocol (SOAP), remote procedure call (RPC) or object broker type technology.

Web services 102 are accessible directly by other services (represented by communication link 106) or a software application, such as Web service application 110 (as represented by communication links 112 and 114). Each Web service 102 is illustrated as including one or more servers that execute software to handle requests for particular services. Such services often maintain databases 107 that store information to be served back to requesters. Web services may be configured to perform any one of a variety of different services. Examples of Web services include login verification, notification, database storage, stock quoting, location directories, mapping, entertainment, shopping, calendars, news, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The client devices represented generally as number 120 may communicate with one another using standard protocols as well, as represented by an exemplary XML link 131 between clients 120(3) and 120(4).

The client devices 120 can be implemented many different ways. Examples of possible implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on some type of network platform such as one or more server(s) 134. The Web application 110 may utilize Web services 102 when handling and servicing requests from client 120. The Web application 110 is composed of one or more software applications 130 that are executing on one or more servers 134 or other computer systems. Note that a portion of Web application 110 may reside on one or more of clients 120. Alternatively, Web application 110 may coordinate with other software on clients to accomplish tasks. In one exemplary implementation, one of the software applications 130 may include a Commerce Server™ family of products provided by Microsoft Corporation of Redmond, Wash., USA, and/or other application server application programs.

Web application 110 may include the ability to monitor Web services, servers, and/or client devices 120 interactions with one or more Web site(s) 160(1), . . . , 160(J). The Web sites, referred to generally as 160, can operate on Web services 102, servers 134 and/or client devices 120. Web application 110 may also be implemented at a client to monitor Web sites 160. Client 120(3) represents the situation where a Web application 110 including applications 162 (which may be identical to server-based applications 130), but modified for any number of client purposes to monitor interactions with Web sites 160.

Click Stream Analysis: Requests at Web Pages, Path Calculation Report

Figure 2:
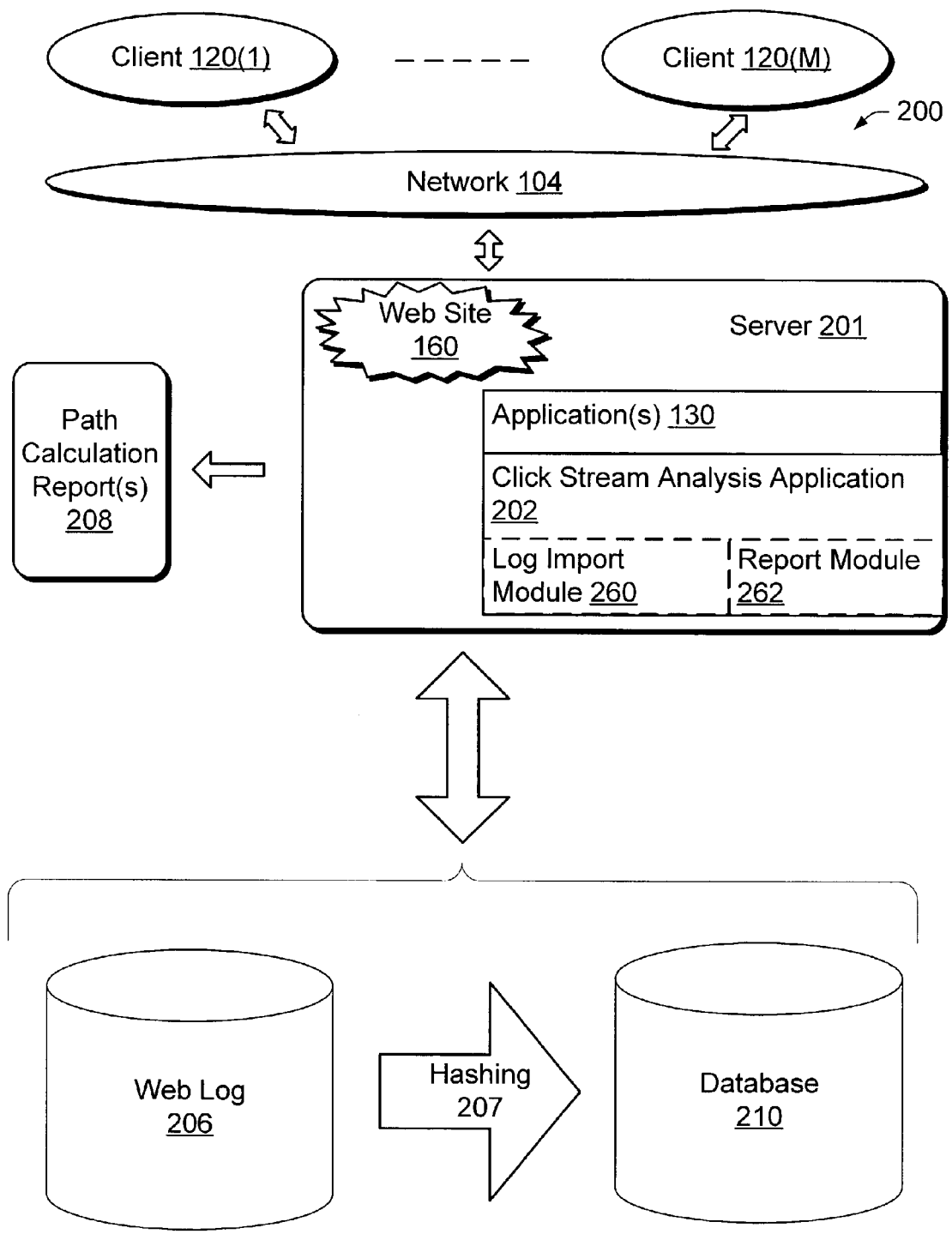
FIG. 2 shows how a server may extract information from a web log and store the information in a database to perform click stream analysis.
Figure 3:
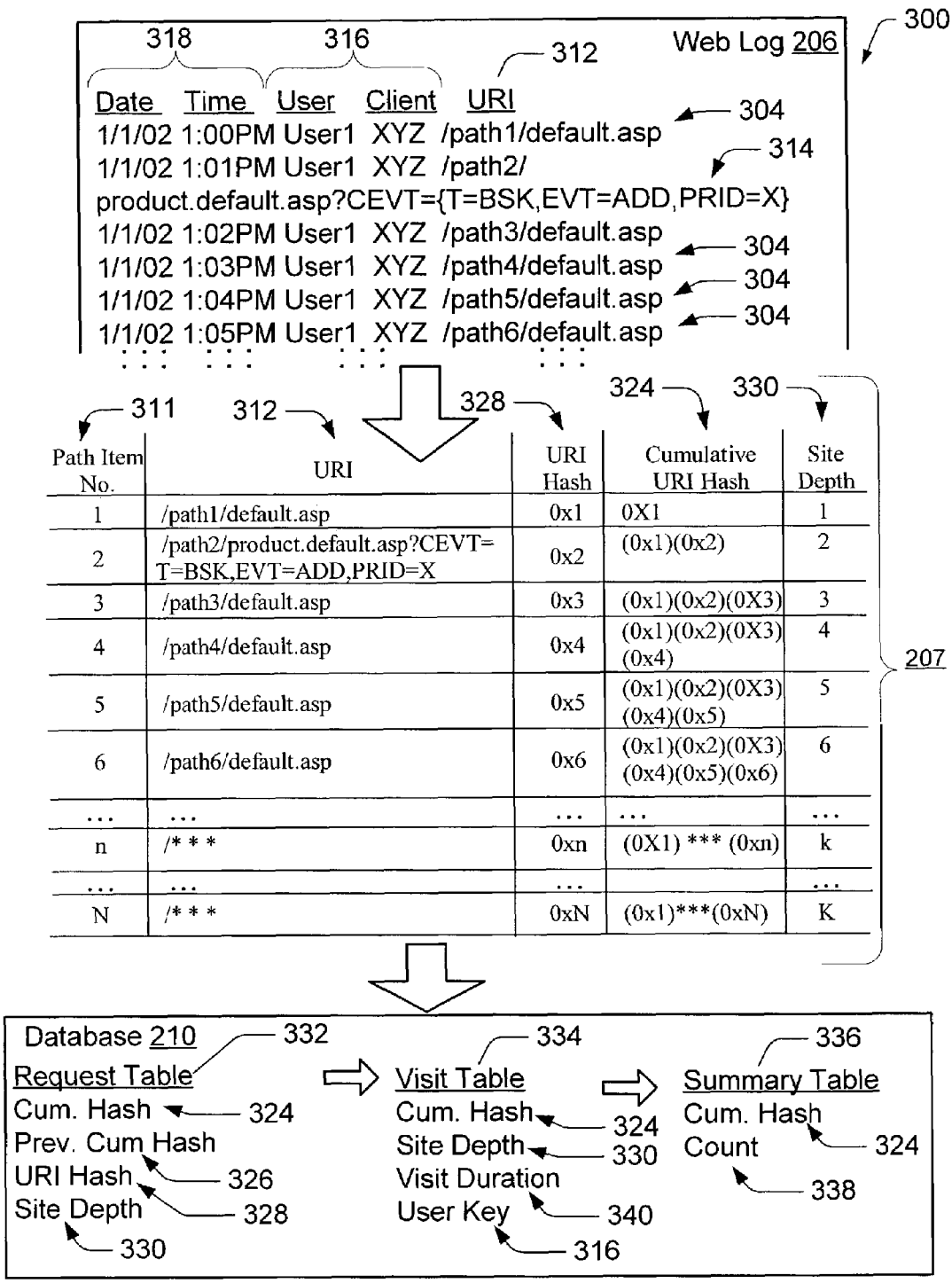
FIG. 3 shows a sequential series of tables as respective logical representations of the extraction of information from a web log, the performance of a hashing algorithm on the extracted information, and the storage of the hashed results in a database from which click stream analysis can be performed.

FIGS. 2-3 shows a Web site 160 operating on a server 201 and Web log 206 having records 304, 314 therein. Server 201 represents any type of computer device (such as the servers described with reference to FIG. 1) capable of performing functionality associated with hosting a Web site. Web site 160 comprises a set of pages. The pages are linked together allowing a visitor to move from one page another. The arrangement of pages constitutes a part of a Web site's content topology. A page or a set of pages can contain or point to a variety of resources, including images, text, scripts, links to resources and so forth. A user may make "requests" while on a page of the Web site by "clicking" on a designated location and being linked to a desired location or cause an event to occur. For example, a request may include clicking on and/or interacting with an advertisement, traversing from one page to another, purchasing an item, adding an item to a virtual shopping basket, etc.

Some of the requests made by a user may also be designated a commerce event by one of the software applications 130. As described above, a commerce event describes any request made by a visitor to a Web site that is deemed a point of great interest, because the event typically represents a culmination of a user's navigational journey(s) through a Web site or results in some type of request that determines the outcome of the navigation. For instance, while visiting a Web site a user may purchase a product, click on an advertisement, add an item to a virtual shopping basket: all of which are the type requests that are usually considered a commerce event, because they represent special or the more interesting requests of a user's click activity. Further, the software applications 130 may also contain the flexibility to permit personnel managing the Web site 160 to designate additional or alternative requests that they consider to be a commerce event on the Web site 160.

Each time a user makes a request on the Web site 160, the request invokes one or more applications 130 to log a Universal Resource Identifier (URI) corresponding to whatever resource, page, advertisement, or other related item was clicked-on as part of a record 304. Each record 304 is stored in Web log 206. Each record 304 may also contain information such as the type of request as designed by a Universal Resource Identifier (URI) 312, a user key 316 logically representing a user who paid a visit to the Web site 160, historical data (not shown), the date and time of the visit 318, how the user entered the Web site (not shown), what browser (not shown) was used to enter the site, a previous URI (not shown) of a different Web site that the user viewed that may have enabled the user to visit the present Web site, and other information pertinent to tracking a user's interactions with the Web site 160. Additionally, certain URI 312 maybe be of particular interest and the corresponding request can be designated as a commerce event record 314 in records 304 of Web log 206.

As used herein, a "visit" refers to a single sequence of requests made by a user, such as pages viewed while at a Web site from a certain period of time when the user enters the Web site, to when the user exits the Web site, where the time period between each chronologically contiguous click within the visit does not exceed a given timeout threshold. Click stream analysis application 202, through the log import module 260, is able to infer a visit from the web site 160 when no hits are received from a particular user after the last previous hit for a default period of time such as 30 minutes. In one implementation it is possible for the period of time used to determine what length of time should be used between the time a user enters a Web site to the time the user exits the Web site, to be determined by personnel managing the Web site. Click stream analysis application 202 permits this time to be selectable. Additionally, a visit may be determined by other techniques as described above. Of course, other durations, shorter or longer, may be selected for purposes of determining a visit. Other methodologies can also be used to infer a visit. For example, if the referring Universal Resource Locator (URL) is from a different domain than the site under analysis, then a visit can be inferred when the URL chain is broken.

In the example of FIG. 3, web log 206 shows the first six of many requests made by a single user (User1) of client device XYZ during one visit to web site 160. As per the first record 304, the User1 entered the Web site on Jan. 1, 2002 at 1 PM. User1 then added an item to a virtual shopping basket on the user's second click, as denoted by the URI 312 in record 314 of Web log 206. As such, the record 314 contains a request representing a commerce event. User1 then performed the next four requests as designated by URI 312 referencing, respectively, \path3, \path4, \path5, and \path6. Although web log 206 is shown in FIG. 3 as being truncated, it is intended to represent an unlimited number of requests (URI 312) of User1 as were made to the server(s) of the Web site 160 during the visit of User1. Of course, the web log 206 also contains each of the requests of all other users that visited the web site 160. Such requests, and users making the same, have been omitted from web log 206 depicted in FIG. 3 for the sake of brevity.

As shown in FIG. 2, click stream analysis application 202 (which may be part of the applications 130 of operate in conjunction with applications 130) is able to analyze a user's requests when visiting the web site 160. Click stream analysis application 202 includes a log import module 260 that imports (i.e., extracts) data from the web log 206. Optionally, the log import module 260 can import or extract data from the web log 206 of each of more than one server the services request from the users of the web site 160. Once these data have been imported and/or extracted, the click stream analysis application 202 then can parse these data and store the result thereof in a database 210. In one implementation, a SQL Server 2000™ product provided by the Microsoft Corporation of Redmond, Wash., USA is used to create and maintain the database 210, although other implementations are not limited to this particular arrangement. Click stream analysis application 202 also includes a reporting module 262 that analyzes information stored in the database 210, and based on that analysis, produces a path calculation report 208 that shows a number of sequential requests made by each user during their respective visits to the web site 160.

Database: Logical Representation of Tables from Techniques Including Hashing

The path calculation report 208 provides analysis concerning the Web log 206 and may be may produced by reporting module 262 by reconstructing visits to the Web site by one or more users. Each request performed by each user of the web site 160 is identified in the path calculation report 208, including a number of requests made by each user. This reporting includes any such request representing any record 314 in web log 206 that characterizes the purchasing of an item or other request of particular interest. The particular requests made by users prior to and/or subsequent to the requests of particular interest can be further examined in a Web analyst's review of the path calculation report 208. Thus, the path calculation report 208 permits personnel (e.g., analyst) to monitor the Web site 160 and to gather detailed information on all of any given user's click activity prior to and subsequent to any record 314 in web log 206 that logically represents a commerce event. The path calculation report 208 may be displayed to an analyst in soft form, such as by a display on a client device, or in other formats such as a hard copy printed by a printer.

The path calculation report 208 is produced by extracting data from the Web log 206 (performed by log import module 260), populating database 210 with information (also performed by log import module 260), and by searching database 210 for user click activity (performed by report module 262) according to default parameters or those requested by a Web site analyst. The database 210 can be organized in a fashion to permit the reconstruction of all of the user's visit from potentially several different servers. Consequently, by focusing-in on requests (those designated a "commerce event") that were performed on the Web site that are of greater importance to the Web site analyst, it can be determined the precise behavior (unlimited series of requests on which pages) that led a user to make a request corresponding to the commerce event or what type of requests occurred after the commerce event.

Hashing Process 207

In one implementation, database 210 seen in FIG. 3 includes three tables: a request table 332, a visit table 334, and a summary table 336. Each table is described below. These tables need not be actually formed but can be kept as logical representations in database 210. Tables 332, 334, and 336 are formed by techniques that include compressing the corresponding one or more URI 312 of user/client 316 during one visit to produce a fixed length number. This fixed length number, for the purpose of click stream analysis, is sufficiently to uniquely represent any particular click path. In various implementations, the fixed length number can be formed by a hashing process 207. Due to the potentially immense amount of data needed to represent all user requests during a period of time at a high user volume web site, hashing process 207 can be used to represent the user activity with less accumulated volume of data than otherwise.

Hashing process 207 can be implemented by hashing the large string of arbitrary length represented by each URI 312 in a compression that produces a fixed length (e.g. 128-bits or 8 bytes) integer. The compression can be performed using known hashing algorithms. In one implementation, the CryptoAPI (Crypto Application Programming Interface) can be used as the hashing algorithm. In another implementation, the MD4 CryptoAPI hash algorithm can be used to create a 128-bit hash value for use by 32-bit computers. Other hashing algorithms include the CryptoAPI MD2, MD5, and Secure Hash Algorithm (SHA).

FIG. 3 shows a logical representation of the results of hashing process 207 for all clicks made by one user during one visit to the web site under analysis. An unlimited number of the user's click activity is represented by path item numbers 311 from one (1) to N as shown in the column titled "Path Item No." in hashing process 207 in FIG. 3. Each path item number 311 is seen as a row in a table in the logical representation of hashing process 207. Each row includes URI 312 of the request by the user 316, a URI hash 328 which is the URI 312 after being hashed, a cumulative hash 324 which is a hash of the previous hashes, and a site depth 330 that represents the depth to which the user 316 clicked within the web pages of the Web site 160. The cumulative hash 324 for the row is formed by hashing the URI hash 328 of the row with each of the cumulative hashes 324 in the previous rows. In effect, the cumulative hash 324 uses the hash from the previous cumulative hash. As such, memory is not needed for all of the hashes of all the paths prior to the current path that is being processed. The table for hashing process 207 shows each hash by the delimiter "0x" and a sequential number. This representation is intended to be a fixed length number for URI hash 328 and for cumulative hash 324. URI hash 328 is a hash of URI 312. Cumulative hash 324 represents the entire click path of the user. As such, cumulative hash 324 will be substantially similar to like click paths of other users during other visits to web site 160.

Request Table 332

FIG. 3 shows a request table 332 in database 210 as having fields that make up one entry in the request table 332. The entry in request table 332 provide a logical representation of one request by a one user to a server for the web site during one visit by the user to the web site. The fields in the entry in the request table 332 are derived from one (1) row in the table depicted for the hashing process 207, with the exception of a previous cumulative hash 326 field which is the cumulative hash 324 of the immediately previous row and represents the last request made by the user to the server during the user's same visit.

Visit Table 334

FIG. 3 shows a visit table 334 in database 210 as having fields in one (1) entry that summarize the entries in the request table 332 for one user during one visit to the web site. Thus, the one (1) entry in visit table 334 provides a logical representation of one visit by one user to the web site. The fields in the entry in the visit table 334 are derived from the rows in the request table 332 corresponding to the Web site visit by the user. The fields 324 and 330 in visit table 334 corresponds to the last entry for the user's visit in the request table 332. A user key field 316 in visit table 334 is taken from web log 206 and is a logical representation of the user at the web site. A visit duration field 340 is derived from the first and last date/time fields 318 in the web log 206 for the respective entry and exit of the user at the web site to quantify the length of the user's visit. Alternatively, a value for the visit duration field 340 can be inferred such as where the time from when the user enters the web site exceeds a given threshold (e.g. a timeout threshold). The duration of the user's visit can thus be inferred when no hits are received from the particular user after the last previous hit for a default period of time, such as 30 minutes. Of course, other durations, shorter or longer, may be selected for purposes of determining a visit. Other methodologies can also be used to infer the visit and a duration thereof. For example, if the referring URL is from a different domain than the web site under analysis, then a visit by a user can be inferred when the URL chain is broken and a corresponding length thereof can be calculated.

Summary Table 336

An optional summary table 336 can be formed by identifying each unique cumulative hash 324 that is formed in the hashing process 207 across all visits by all users during a period time. Cumulative hash 324 in optional summary table 336 uniquely represents only one particular click path through the web site that was taken by a user during a visit. Each such unique click path is assigned to a unique count 338. Count 338 can be made unique, for example, by an assigned ordinal that advances by one for each unique click path detected at the web site.

Web Log Processing, Hashing, and Path Calculation Reporting

Figure 4:
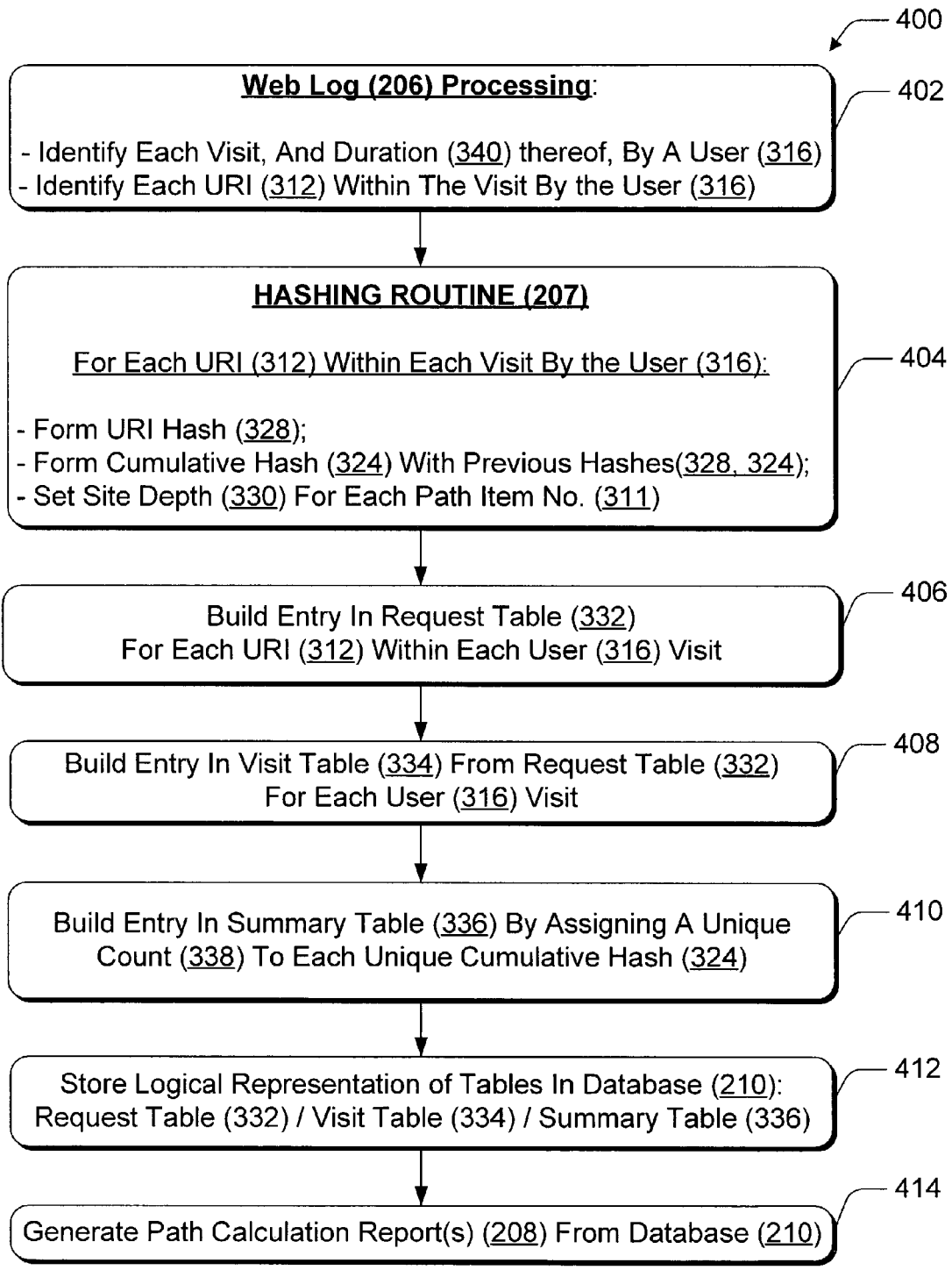
FIG. 4 is a flow chart illustrating an exemplary method for processing a Web log, across all users and visits thereof, to reconstruct and report on the clicks in a user's visit to a Web site.

FIG. 4 is a flow chart illustrating an exemplary method 400 for processing Web log 206 to reconstruct all requests made by a user during the user's visit to a Web site. Method 400 includes blocks 402-414. The order in which the method is described is not intended to be construed as a limitation. Additionally, portions of the operations may be optional or performed intermittently. Furthermore, the method 400 can be implemented in any suitable hardware, software, firmware, or combination thereof. In the exemplary implementation, method 400 is executed by click stream analysis application 202 in conjunction with software applications 130.

Web log 206 is processed at block 402 to identify each visit, and the duration 340 thereof, by a user 316, and to identify each URI 312 within the visit by the user 316. At block 404, the hashing routine 207 is performed for each URI 312 within each visit by the user 316. As such, the hashing routine 207 forms the URI hash 328, and forms the cumulative hash 324 by hashing the present URI hash 328 with each previous cumulative hash 324 that had been formed for the user's visit. A site depth 330 is set for each request by the user 316 during the visit to the web site, as represent by the path item no. 311 in the hashing process 207. Note that while the path item no. 311 is an assigned ordinal that advances by one for each request by the user during the visit, up to a value of 'N', the site depth 330 is not so assigned but is rather a logical representation of the depth to which the user 316 clicked within the web pages of the web site.

At block 406, an entry is formed in request table 332 for each request (path item no. 311) by one user 316 during a visit to the web site. At block 408, an entry is formed in visit table 334 for one visit by one user 316 to the web site. At block 410, an entry can be formed in the optional summary table 336 by assigning a unique count 338 to each unique cumulative hash 324 formed in hashing process 207. At block 412, one or more of the tables 332, 334, and optionally 336 can be stored in database 210. As stated above, tables 332, 334, and 336 need not be actually formed but can be deduced by equivalent logical representations from data in web log 206. A path calculation report can be produced at block 414 of method 400.

The path calculation report is derived from data in one or more of the tables 332, 334, and optionally 336 stored in database 210. As such, the path calculation report can contain any of variety of different representation of the data stored in database 210 that an analyst of the Web site 160 might find helpful. For instance, the analyst may wish to identify each unique click path that has been taken by one or more users through the Web site, as well as the number of users that took each unique click path. The sequence requests of the unique click path can be deduced as to the respective URI 312 from respective entries in the request table 332 and the visit table 334, with or without use of the optional summary table 336. These sequences of URI 312 can be shown in the path calculation report path and then used to perform extensive behavior analysis across the click activities of many users during their respective visits to the Web site.

By way of example, and not by way of limitation, there is set forth as follows an exemplary report layout that could be used to produce a Path Calculation Report that is derived from the data in tables 332, 334, and 336 of database 210:

Web site 160. The Web site 160 contains one or more web pages. Each user 316 of the Web site 160 and each visit made by each user 316 of the Web site 160 can be identified from the web log 206. A site depth 330 in the web pages of the web site 160 corresponding to each URI 312 can also be identified. The site depth 330 is the sequential number of the request by the user 316 in the visit (e.g. $1^{st}$ request, $2^{nd}$ request, $3^{rd}$ request, etc.). Consequently, the last request that is made by a user during a visit to a Web site will have the highest value site depth 330. Each URI 312 can be compressed, as discussed above, to form a URI hash number 328 that has a first fixed length.

Within each identified visit by each identified user 316, and for each URI 312 within the visit, a request entry can be made in the request table 332. The request entry in the request table 332 can include the site depth 330 of the corresponding request, the URI hash number 328, and a previous cumulative hash number 326 of a second fixed length. The previous cumulative hash number 326 can be is formed by compressing together each of the URI hash numbers 328 of the chronologically prior request entries of the visit that are in the request table 332. This compression can be a logical operation rather than an operation that is physically performed. Even though all the previous requests are available in a database, there is no need to literally go and retrieve all of the computed hashes for the previous requests and then to recalculate the cumulative hash. Rather, the hash can be calculated

| | Path Calculation Report | | | | | |
| --- | --- | --- | --- | --- | --- | --- |
| | Time Period 01/01/2003: 6:00 AM-10:00 PM (EST) | | | | | |
| | Web Site: "www. OnLineRetailer.com" | | | | | |
| | Number of User's Visiting the Web Site: 9999 | | | | | |
| | Number of Visits To The Web Site: 9999 | | | | | |
| Users | URI 1 | URI 2 | URI * | URI ** | URI *** | URI N |
| 999 | \path1\default.asp | | | | | |
| 999 | \path1\default.asp | \path2 | | | | |
| * * * | * * * | * * * | * * * | * * * | * * * | * * * |
| 999 | \path3\search | \path3\sea.results | | | | |
| * * * | * * * | * * * | * * * | * * * | * * * | * * * |
| 999 | \path4\product.default.asp?CEVT={T=BSK,EVT=Add,PRID=X} | | | | | |
| | | \path5 | \path6 | \path7 | * * * | \path22 |
| * * * | * * * | * * * | * * * | * * * | * * * | * * * |
| 999 | \path5\store\buyit\ | \path1\default.asp | | | | |
| | | | \path9 | * * * | * * * * * * | \pathK |

The foregoing exemplary Path Calculation Report has a heading for a particularized date and time period that includes the number of visits to and users of a designed Web site to which the report pertains. Each row of the Path Calculation Report shows, in sequential order, the unique click path through the designed Web site that was taken by the number users shown in the "Users" column. As such, the "Users" column shows, for each row, the number of users that followed the particular click path of that row. Each subsequent column in that row shows, in sequential order, each of the one or more URI 312 corresponding to each of the requests of in the unique click path of the row on the report. As shown on the report, an unlimited number ('N') of requests can be shown for each row on the Path Calculation Report. An unlimited site depth ('K' for '\pathK') for the clicks of a user into the web pages at the Web site can also be shown. A discussion of the derivation of the data for the Path Calculation Report from database 210 and web log 206 follows.

The web log 206 has therein a plurality of URI each corresponding to a request made by a user 316 to a server of a based on the cumulative hash (e.g. only one number) plus the new incoming URI (e.g. the string). In practice, if is likely that the combination of the single number that is hashed with the new incoming path (e.g. the URI) will yield a new unique number (e.g. the new cumulative hash). By knowing the depth, another degree of uniqueness is added.

The request entry also includes a cumulative hash number 324 of a third fixed length that is formed by compressing the URI hash number 324 with the previous cumulative hash number 326. These compressions can be performed as was discussed above with respect to compression algorithms.

A visit entry can be formed in the visit table 334 for each visit by a user 316 to the web site 160. The visit entry can include a visit duration 330 of the visit by the user 316 that can be derived from the date/time 318 of the requests made during the visit, or by other techniques disclosed herein. The visit entry can also include a logical representation 316 of the user and, for the chronologically last request entry within the visit, the cumulative hash number 324 and the site depth 330 of the corresponding request.

A summary entry can be formed in the summary table 336 for each unique cumulative hash number 324 in the visit entries of visit table 334, where each summary entry includes a count 338 that represents the number of visit entries in visit table 334 that have the same cumulative hash number 324.

The sequential order of all of the URI that correspond to each summary entry in the summary table 336 can be derived by performing a lookup in a table that can be formed so as to correspond to each of the URI hash numbers 324. In order to obtain a path calculation report by using the tables described above, a query is first made to the summary table 336. This first query will give a cumulative hash for a given path that can be used in a second query made against the request table 336. This second query gives an individual URI hash. The individual URI hash can be used in a third query of an additional 'URI table' which maps a URI hash to a string. In addition, the URI table gives a "pointer" to the previous cumulative hash. Given the foregoing, a process can be repeatedly performed. In this process, a query is made to the request table 336 based on the cumulative hash, and then the individual URI hash and the previous path can then be found as described above.

As an alternative, the sequential order of all of the URI that correspond to each summary entry in the summary table 336 can be derived by decompressing each URI hash number 324 in each request entry of request table 332 that corresponds to one visit entry in visit table 334 that in turn corresponds to each summary entry in summary table 336. This derivation can be performed by identifying one visit entry in the visit table 334 that corresponds to one of the summary entries in summary table 336 according to a match of the cumulative hash number 334 in each. Then, an identification can be made of each request entry in request table 332 that corresponds to the identified one visit entry in visit table 334 by matching in each the cumulative hash number 324 and the site depth 330.

Thereafter, an identification can be made of each request entry in request table 332 that corresponds to the identified one request entry in request table 332 within the one visit by the one user 316. When so identified, a decompression can be performed of each URI hash number 328. The decompression of the URI hash number 328 yields the URI of the request. This decompression will preferably be conducted in the sequential order specified by the value of site depth 330 so that the 'path click' of the visit will be reconstructed in proper order. As such, the URI of each request in each entry in request table 332 will be identified for each unique visit to the Web site 160.

The identification of each of the request entries in request table 332 that correspond to the identified one request entry within the one visit by the one user 316 can be performed by identifying each match of the previous cumulative hash number 326 of the one request entry with the cumulative hash entry 324 of another said request entry that has a site depth 330 that is less than the site depth 330 of the one request entry. The first, second and third fixed lengths as used in the compression algorithms (e.g. CryptoAPI, MD2, MD5, SHA, etc.) can have the same length.

Exemplary Computing System and Environment

Figure 5:
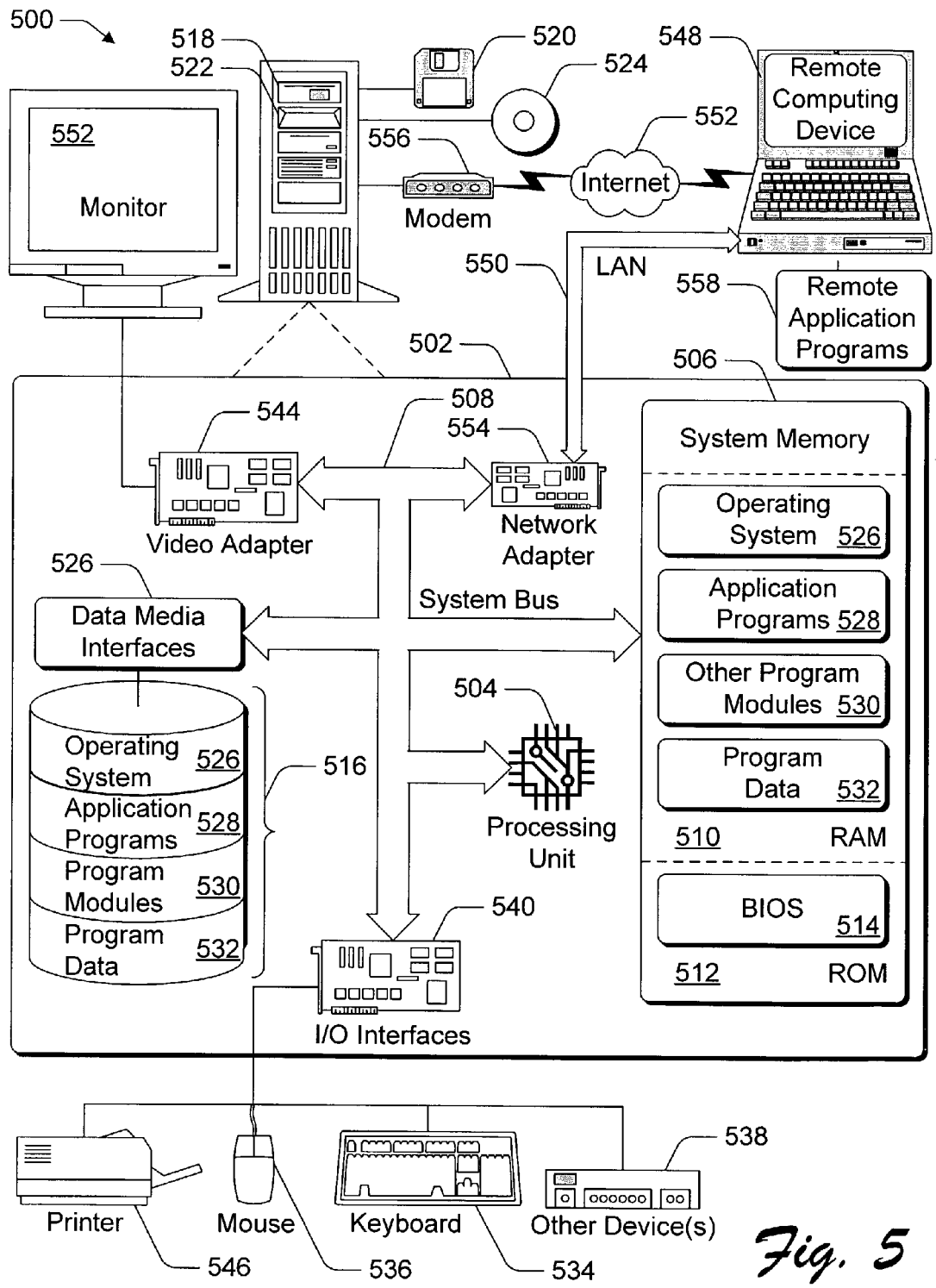
FIG. 5 illustrates an example of a computing environment within which the computer, network, software applications, methods and systems described herein can be either fully or partially implemented.

FIG. 5 illustrates an example of a computing environment 500 within which the applications 130 including click stream analysis application 202 described herein can be either fully or partially implemented. Exemplary computing environment 500 is only one example of a computing system and is not intended to suggest any limitation as to the scope of use or functionality of the network architectures. Neither should the computing environment 500 be interpreted as having any dependency or requirement relating to any one or combination of components illustrated in the exemplary computing environment 500.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, gaming consoles, distributed computing environments that include any of the above systems or devices, and the like.

The applications 130 (including click stream analysis application 202) may be described in the general context of computer-executable instructions, such as program modules, being executed by a computer. Generally, program modules include routines, programs, objects, components, data structures, etc. that perform particular tasks or implement particular abstract data types. The applications 130 (including click stream analysis application 202) may also be practiced in distributed computing environments where tasks are performed by remote processing devices that are linked through a communications network. In a distributed computing environment, program modules may be located in both local and remote computer storage media including memory storage devices.

The computing environment 500 includes a general-purpose computing system in the form of a computer 502. The components of computer 502 can include, but are not limited to, one or more processors or processing units 504, a system memory 506, and a system bus 508 that couples various system components including the processor 504 to the system memory 506.

The system bus 508 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 502 typically includes a variety of computer readable storage media. Such media can be any available media that is accessible by computer 502 and includes both volatile and non-volatile media, removable and non-removable media. The system memory 506 includes computer readable storage media in the form of volatile memory, such as random access memory (RAM) 510, and/or non-volatile memory, such as read only memory (ROM) 512. A basic input/output system (BIOS) 514, containing the basic routines that help to transfer information between elements within computer 502, such as during start-up, is stored in ROM 512. RAM 510 typically contains data and/or program modules that are immediately accessible to and/or presently operated on by the processing unit 504.

Computer 502 can also include other removable/non-removable, volatile/non-volatile computer storage media. By way of example, FIG. 5 illustrates a hard disk drive 516 for reading from and writing to a non-removable, non-volatile magnetic media (not shown), a magnetic disk drive 518 for reading from and writing to a removable, non-volatile magnetic disk 520 (e.g., a "floppy disk"), and an optical disk drive 522 for reading from and/or writing to a removable, non-volatile optical disk 524 such as a CD-ROM, DVD-ROM, or other optical media. The hard disk drive 516, magnetic disk drive 518, and optical disk drive 522 are each connected to the system bus 508 by one or more data media interfaces 526. Alternatively, the hard disk drive 516, magnetic disk drive 518, and optical disk drive 522 can be connected to the system bus 508 by a SCSI interface (not shown).

The disk drives and their associated computer-readable media provide non-volatile storage of computer readable instructions, data structures, program modules, and other data for computer 502. Although the example illustrates a hard disk 516, a removable magnetic disk 520, and a removable optical disk 524, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 516, magnetic disk 520, optical disk 524, ROM 512, and/or RAM 510, including by way of example, an operating system 526, one or more application programs 528, other program modules 530, and program data 532. Each of such operating system 526, one or more application programs 528, other program modules 530, and program data 532 (or some combination thereof) may include an embodiment of the applications 130 (including click stream analysis application 202).

Computer system 502 can include a variety of computer media indentified as communication media. Communication media typically embodies computer readable instructions, data structures, program modules, and includes any information delivery media.

A user can enter commands and information into computer system 502 via input devices such as a keyboard 534 and a pointing device 536 (e.g., a "mouse"). Other input devices 538 (not shown specifically) may include a microphone, joystick, game pad, satellite dish, serial port, scanner, and/or the like. These and other input devices are connected to the processing unit 504 via input/output interfaces 540 that are coupled to the system bus 508, but may be connected by other interface and bus structures, such as a parallel port, game port, or a universal serial bus (USB).

A monitor 542 or other type of display device can also be connected to the system bus 508 via an interface, such as a video adapter 544. In addition to the monitor 542, other output peripheral devices can include components such as speakers (not shown) and a printer 546 which can be connected to computer 502 via the input/output interfaces 540.

Computer 502 can operate in a networked environment using logical connections to one or more remote computers, such as a remote computing device 548. By way of example, the remote computing device 548 can be a personal computer, portable computer, a server, a router, a network computer, a peer device or other common network node, and the like. The remote computing device 548 is illustrated as a portable computer that can include many or all of the elements and features described herein relative to computer system 502.

Logical connections between computer 502 and the remote computer 548 are depicted as a local area network (LAN) 550 and a general wide area network (WAN) 552. Such networking environments are commonplace in offices, enterprise-wide computer networks, intranets, and the Internet. When implemented in a LAN networking environment, the computer 502 is connected to a local network 550 via a network interface or adapter 554. When implemented in a WAN networking environment, the computer 502 typically includes a modem 556 or other means for establishing communications over the wide network 552. The modem 556, which can be internal or external to computer 502, can be connected to the system bus 508 via the input/output interfaces 540 or other appropriate mechanisms. It is to be appreciated that the illustrated network connections are exemplary and that other means of establishing communication link(s) between the computers 502 and 548 can be employed.

In a networked environment, such as that illustrated with computing environment 500, program modules depicted relative to the computer 502, or portions thereof, may be stored in a remote memory storage device. By way of example, remote application programs 558 reside on a memory device of remote computer 548. For purposes of illustration, application programs and other executable program components, such as the operating system, are illustrated herein as discrete blocks, although it is recognized that such programs and components reside at various times in different storage components of the computer system 502, and are executed by the data processor(s) of the computer.

Conclusion

The entire click path of a user during a visit to a web site can be reconstructed by using click path compression techniques. A path calculation report can be produced from the reconstruction to show the sequential order of a virtually unlimited number of clicks in each unique click path during any web site visit by any user. The reconstruction, and/or the path calculation report, can be used to perform extensive behavior analysis of the web site users.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. One or more computer-readable storage media having computer-executable instructions that, when executed by one or more processors, perform a method, comprising:
   deriving a path calculation report from a data structure for display to a user, the data structure comprising:
   a request table including a request entry for a request made during a visit by a user to a server of a Web site containing one or more web pages, wherein the request entry includes:
      a Uniform Resource Identifier (URI) hash number having a first fixed length that is formed by compressing a URI corresponding to the request,
      a depth in the web pages of the web site corresponding to each URI, wherein the depth is a sequential number of the request by the user in the visit,
      a previous cumulative hash number of a second fixed length that is formed by compressing together each URI hash number of the chronologically prior request entries in the visit, and
      a cumulative hash number of a third fixed length that is formed by compressing the URI hash number with the previous cumulative hash number;
   a visit table including one visit entry for each visit by the corresponding user, wherein the visit entry includes:
      a duration of the visit by the user,
      a logical representation of the user, the cumulative hash number from the chronologically last request entry within the visit by the user, and the depth from the chronologically last request entry within the visit by the user; and a summary table including one summary entry for each unique cumulative hash number in the visit entries, wherein each summary entry includes the unique cumulative hash number and a count of the visit entries that include the unique cumulative hash number.

2. The one or more computer-readable storage media comprising the data structure as defined in claim 1, wherein a sequential order of all of the URI that correspond to each summary entry is derived by decompressing each URI hash number in each request entry that corresponds to one visit entry that corresponds to each summary entry.

3. The one or more computer-readable storage media comprising the data structure as defined in claim 1, wherein a sequential order of all of the URI that correspond to one summary entry is derived by a method comprising:

identifying one visit entry that corresponds to the summary entry by matching the cumulative hash number in the one visit entry with the cumulative hash number in the summary entry;

identifying one request entry that corresponds to the identified one visit entry by matching in the one request entry and the one visit entry:
the cumulative hash number; and
the depth;

identifying each request entry that corresponds to the identified one request entry within one visit by one user; and decompressing, in the sequential order of the depth, each URI hash number in each request entry that corresponds to the identified one request entry within one visit by one user.

4. The one or more computer-readable storage media comprising the data structure as defined in claim 3, wherein the identifying each request entry that corresponds to the identified one request entry within one visit by one user further comprises:

identifying each match of the previous cumulative hash number of the one request entry with the cumulative hash entry of another request entry that has a depth that is less than the depth of the one request entry.

5. The path calculation report derived from data in the one or more computer-readable storage media comprising the data structure defined in claim 1, the path calculation report comprising:

a display of the count of the visit entries that include the unique cumulative hash number; and a display, in sequential order, of all of the URI that correspond to the summary entry as derived from a decompression of each URI hash number in each request entry that corresponds to the one visit entry that corresponds to the summary entry.

6. The one or more computer-readable storage media comprising the data structure as defined in claim 1, wherein the first, the second and the third fixed lengths have the same length.

7. A method, implemented by one or more processors of a computing device, comprising:

within a plurality of Universal Resource Identifiers (URI) each corresponding to a request made by a user to a network site, identifying for each request:
a corresponding visit made by the user to the network site;
a depth represented by a sequential number of the request; and a URI hash number having a first fixed length that is formed by compressing one of the plurality of URI;

within each visit by each user, forming a request entry for each request that includes:
the depth,
the URI hash number,
a previous cumulative hash number of a second fixed length that is formed by compressing together each URI hash number of the chronologically prior request entries in the visit, and
a cumulative hash number of a third fixed length that is formed by compressing the URI hash number with the previous cumulative hash number; and forming a visit entry that includes:
a duration of the visit by the user,
a logical representation of the user,
the cumulative hash number for the chronologically last request entry within the visit; and
the depth of the corresponding request for the chronologically last request entry within the visit, wherein a path calculation report is created for use in click stream analysis from the request entry and the visit entry.

8. The method as defined in claim 7, further comprising deriving a sequential order of all of the URI that correspond to each unique cumulative hash number in the visit entries.

9. The method as defined in claim 8, wherein the deriving a sequential order of all of the URI further comprises:

identifying one request entry that corresponds to one of the visit entries that has the unique cumulative hash number by matching in the identified one request entry and the one of the visit entries:
the cumulative hash number, and
the depth, identifying each request entry that corresponds to the identified one request entry within one visit by one user; and decompressing, in the sequential order of the depth, each URI hash number in each request entry that corresponds to the identified one request entry within one visit by one user to arrive at a sequential order of all of the URI.

10. The method as defined in claim 9, wherein the identifying each request entry that corresponds to the identified one request entry within one visit by one user further comprises:

identifying each match of the previous cumulative hash number of one request entry with the cumulative hash entry of another request entry that has the depth that is less than the depth of the one request entry.

11. The method as defined in claim 7, wherein the first and second fixed lengths have the same length.

12. A method, implemented by one or more processors of a computing device, comprising:

identifying, within a Web log having therein a plurality of Universal Resource Identifiers (URI), each URI corresponding to a request made by a user to a server of a Web site containing one or more web pages:
each user of the Web site;
each visit made by each user of the Web site;
a depth in the web pages of the web site corresponding to each URI, wherein the depth is the sequential number of the request by the user in the visit; and
a URI hash number having a first fixed length that is formed by compressing each URI;

within each identified visit by each identified user:
for each URI within the visit, forming a request entry that includes:
a depth of the corresponding request;
a URI hash number;

a previous cumulative hash number of a second fixed length that is formed by compressing together each URI hash number of the chronologically prior request entries in the visit; and a cumulative hash number of a third fixed length that is formed by compressing the URI hash number with the previous cumulative hash number;

forming a visit entry that includes:
   a duration of the visit by the user;
   a logical representation of the user; and
   for a chronologically last request entry within the visit:
      the cumulative hash number; and
      the depth of the corresponding request;

forming one summary entry for each unique cumulative hash number in the visit entries, wherein each summary entry includes a count of the visit entries that have an identical cumulative hash number; and forming a path calculation report for performing click stream analysis utilizing at least the Web log, the request entry, and the visit entry.

13. The method as defined in claim 12, further comprising deriving a sequential order of all of the URI that correspond to each summary entry by decompressing each URI hash number in each request entry that corresponds to one visit entry that corresponds to each summary entry.

14. The method as defined in claim 13, wherein the deriving a sequential order of all of the URI that correspond to each summary entry further comprises:
   identifying the one visit entry that corresponds to the summary entry by matching the cumulative hash number in the one visit entry with the summary entry;
   identifying one request entry that corresponds to the identified one visit entry by matching in the one request entry and the corresponding identified one visit entry:
      the cumulative hash number, and
      the depth;
   identifying each request entry that corresponds to the identified one request entry within one visit by one user; and
   decompressing, in the sequential order of the depth, each URI hash number in each request entry that corresponds to the identified one request entry within one visit by one user.

15. The method as defined in claim 14, wherein the identifying each request entry that corresponds to the identified one request entry within one visit by one user further comprises:
   identifying each match of the previous cumulative hash number of the one request entry with the cumulative hash entry of another request entry that has a depth that is less than the depth of the one request entry.

16. The method as defined in claim 12, wherein the first, the second and the third fixed lengths have the same length.

17. A computer-readable storage media comprising computer-executable instructions that, when executed by a computer, cause the computer to perform the method as defined in claim 12.

18. An apparatus comprising a processor for producing a path calculation report from a Web log having therein a plurality of Universal Resource Identifiers (URI), each URI corresponding to a request made by a user to a server of a Web site containing one or more web pages, the apparatus comprising:
   a first logic to identify:
      each user of the Web site;
      each visit made by each user of the Web site;
      a depth in the web pages of the web site corresponding to each URI, wherein the depth is a sequential number of the request by the user in the visit; and
      a URI hash number having a first fixed length that is formed by compressing each URI;
   a second logic, within each identified visit by each identified user:
      for each URI within the visit, to form a request entry that includes:
         the depth of the corresponding request,
         the URI hash number,
         a previous cumulative hash number of a second fixed length that is formed by compressing together each URI hash number of the chronologically prior request entries in the visit, and
         a cumulative hash number of a third fixed length that is formed by compressing the URI hash number with the previous cumulative hash number;
      to form a visit entry that includes:
         a duration of the visit by the user,
         a logical representation of the user, and
         for the chronologically last request entry within the visit:
            the cumulative hash number, and
            the depth of the corresponding request;
   a third logic to form one summary entry for each unique cumulative hash number in the visit entries, wherein each summary entry includes a count of the visit entries that have an identical cumulative hash number.

19. The apparatus comprising a processor as defined in claim 18, further comprising logic to derive a sequential order of all of the URI that correspond to each summary entry by decompressing each URI hash number in each request entry that corresponds to one visit entry that corresponds to each summary entry.

20. The apparatus comprising a processor as defined in claim 19, wherein the logic to derive a sequential order of all of the URI that correspond to each summary entry further comprises:
   logic to identify the one visit entry that corresponds to the summary entry by matching the cumulative hash number in the one visit entry with the summary entry;
   logic to identify one request entry that corresponds to the identified one visit entry by matching in the one request entry and the identified one visit entry:
      the cumulative hash number; and
      the depth;
   logic to identify each request entry that corresponds to the identified one request entry within one visit by one user; and
   logic to decompress, in the sequential order of the depth, each URI hash number in each request entry that corresponds to the identified one request entry within one visit by one user.

21. The apparatus comprising a processor as defined in claim 20, wherein the logic to identify each request entry that corresponds to the identified one request entry within one visit by one user further comprises:
   logic to identify each match of the previous cumulative hash number of the one request entry with the cumulative hash entry of another request entry that has a depth that is less than the depth of the one request entry.

22. An apparatus comprising a processor for producing a path calculation report showing each Universal Resource Identifiers (URI) corresponding to each request made during a visit by a user to a server of a network site, the apparatus comprising:
   means for identifying for each request within each visit:

a corresponding visit made by the user to the network site;

a depth represented by a sequential number of the request within the visit; and a URI hash number having a first fixed length that is formed by compressing the URI;

within each visit by each user:

means for forming a request entry for each request that includes:

the depth;

the URI hash number;

a previous cumulative hash number of a second fixed length that is formed by compressing together each URI hash number of the chronologically prior request entries in the visit; and a cumulative hash number of a third fixed length that is formed by compressing the URI hash number with the previous cumulative hash number;

means for forming a visit entry that includes:

a duration of the visit by the user;

a logical representation of the user; and for the chronologically last request entry within the visit:

the cumulative hash number; and the depth of the corresponding request.

23. The apparatus comprising a processor as defined in claim 22, further comprising means for deriving from the cumulative hash number in the visit entries the URI corresponding to each request made during a visit by a user to a server of a network site in a sequential order thereof.

24. The apparatus comprising a processor as defined in claim 23, wherein the means for deriving from the cumulative hash number in the visit entries the URI corresponding to each request made during a visit by a user to a server of a network site in a sequential order thereof further comprises:

means for identifying one request entry that corresponds to one of the visit entries that has the unique cumulative hash number by matching in the one request entry and the corresponding one of the visit entries:

the cumulative hash number; and the depth;

means for identifying each request entry that corresponds to the identified one request entry within one visit by one user; and means for decompressing, in the sequential order of the depth, each URI hash number in each request entry that corresponds to the identified one request entry within one visit by one user to arrive at the sequential order of all of the URI.

25. The apparatus comprising a processor as defined in claim 23, wherein the means for identifying each request entry that corresponds to the identified one request entry within one visit by one user further comprises:

means for identifying each match of the previous cumulative hash number of the one request entry with the cumulative hash entry of another request entry that has a depth that is less than the depth of the one request entry.

26. The apparatus comprising a processor as defined in claim 22, wherein the first fixed length and the second fixed length have the same length.

* * * * *